(12) United States Patent
Zajchowski et al.

(10) Patent No.: US 6,186,508 B1
(45) Date of Patent: Feb. 13, 2001

(54) WEAR RESISTANT COATING FOR BRUSH SEAL APPLICATIONS

(75) Inventors: Paul H. Zajchowski, Enfield; Melvin Freling, West Hartford; Susan M. Meier, Vernon; Roy R. Donovan, deceased, late of Vernon, all of CT (US), by Gail Donovan, executor

(73) Assignee: United Technologies Corporation, Hartford, CT (US)

( * ) Notice: Under 35 U.S.C. 154(b), the term of this patent shall be extended for 0 days.

(21) Appl. No.: 08/950,659

(22) Filed: Oct. 15, 1997

Related U.S. Application Data

(63) Continuation of application No. 08/757,307, filed on Nov. 27, 1996.

(51) Int. Cl.[7] .................................................... F16J 15/16
(52) U.S. Cl. ........................... 277/355; 277/415; 277/940
(58) Field of Search .................................... 277/415, 940, 277/943, 930, 355

(56) References Cited

U.S. PATENT DOCUMENTS

| | | |
|---|---|---|
| 3,917,150 | 11/1975 | Ferguson et al. . |
| 4,202,554 | 5/1980 | Snell . |
| 4,566,700 * | 1/1986 | Shiembob ............................. 277/53 |
| 4,600,202 * | 7/1986 | Schaeffler et al. .................... 277/53 |
| 4,884,820 * | 12/1989 | Jackson et al. ........................ 277/53 |
| 5,110,033 | 5/1992 | Noone et al. . |
| 5,120,582 | 6/1992 | Browning . |
| 5,350,278 | 9/1994 | Burge . |
| 5,405,085 | 4/1995 | White . |
| 5,449,536 | 9/1995 | Funkhouser et al. . |

FOREIGN PATENT DOCUMENTS

| | | |
|---|---|---|
| 0 622 471 A1 | 11/1994 | (EP) . |
| 0 641 869 A1 | 3/1995 | (EP) . |

OTHER PUBLICATIONS

L. Russo and M. Dorfmann, "A Structural Evaluation of HVOF Sprayed NiCr–Cr3C2 Coatings", Proceedings of ITSC Kobe (May, 1995).

* cited by examiner

*Primary Examiner*—Anthony Knight
*Assistant Examiner*—Enoch E. Peavey
(74) *Attorney, Agent, or Firm*—Charles E. Sohl

(57) ABSTRACT

A metallic coating containing hard carbide particles is described. The coating is applied by an HVOF process using powder particles whose size ranges from about 15 to about 44 microns. The carbide particles are held in a 80% nickel-20% chromium matrix. The coating has a reduced tensile compressive stress relative to similar plasma sprayed coatings and exhibits a high strain to cracking value.

4 Claims, No Drawings

WEAR RESISTANT COATING FOR BRUSH SEAL APPLICATIONS

This application is a continuation of application Ser. No. 08/757,307, filed Nov. 27, 1996.

FIELD OF THE INVENTION

This invention relates to brush seals, particularly brush seals used in rotating machinery, and most particularly to brush seals used gas turbine engine applications. The invention comprises a hard coating for the surface upon which the brush is rubbed, a coating which has a superior combination of wear resistance and durability, which is resistant to cracking, and which does not cause excessive bristle wear. The invention also involves the coating application method.

DESCRIPTION OF RELATED ART

Many mechanical designs present requirements for fluid sealing between parts having relative motion. A large number of seal designs are known and one which has particular utility in the field of gas turbines is referred to as a brush seal. Brush seals are described for example in U.S. Pat. Nos. 3,917,150, 4,202,554 and 5,110,033. The general configuration of a brush seal in a gas turbine application is that a plurality of closely spaced stationary bristles surround a rotating shaft. The bristles are oriented substantially normal to the shaft surface and the length of the bristles is sufficient so that the bristles rub on the shaft and the bristles are slightly bent in the direction of shaft rotation. Modern gas turbine engines are required to provide maintenance free operation for many thousands of hours, consequently it is essential that gas turbine brush seals have long lives.

The fibers from which the brush seals are made are generally comprised of metal and often of nickel and cobalt base superalloy materials, especially in high temperature applications.

The free ends or tips of the bristles rub against the moving shaft surface and this sliding interaction is the source of bristle wear.

U.S. Pat. No. 5,449,536 discusses a coating for brush seals comprising an oxide dispersion strengthened metal coating applied by laser spraying. U.S. Pat. No. 5,350,278 suggests an alumina layer.

It has been proposed to use hard facing type coatings to provide a hard surface to interact with the brush seal bristles. The assignee of the present invention has evaluated such a conventional hard facing coating with less than full success. In particular, an industry standard coating comprising (by weight) 75 percent chromium carbide ($Cr_3C_2$) and 25% of a nickel-chrome binder (nominally 80% nickel-20% chrome) applied by a conventional plasma spray process and evaluated. Using a standard plasma spray process it was found to be not possible to apply a coating thicker than about 6–8 mils without cracking and spalling. Excessive bristle wear was observed and coating cracks were a problem. Coating cracks exacerbate bristle wear because the bristles encounter hard sharp crack edges with each rotation of the shaft.

In the particular gas turbine application for which the coating was intended it was desired to have a much thicker coating (on the order of 30–50 mils) to permit longer service life and to permit the seal system to be refurbished by grinding the hard surface down to provide smooth surface for use with a replacement brush set. This was not possible with the standard composition plasma sprayed coating.

Accordingly it is an object of the invention to provide a thick, long lived crack free coating for brush seal applications. It is another object of the invention to provide a system to deposit hard faced coatings adapted for use with brush seals. Another object is to provide a thick coating which can be readily remachined during overhaul and repair. Yet another object of the invention is to provide a brush seal system including the bristles and the coating upon which the bristles rub and the method for depositing such coatings.

SUMMARY OF THE INVENTION

The present invention includes a hard face coating system comprising chromium carbide particles in a nickel-chrome binder. The particular proportion of chromium carbide particles and the hardness of the coating has been optimized for successful brush seal performance. The method of coating application is significant in achieving these results.

The present invention varies in several significant ways from the prior art plasma sprayed hard facing coating which was investigated for brush seal use.

A different process is used to apply the coating. The prior art coating was applied by plasma spray process. The invention coating is applied by a process known as HVOF (high velocity oxyfuel). HVOF systems are described in U.S. Pat. Nos. 5,120,582 and 5,405,085. The HVOF system imparts substantially more energy to the powder being deposited and as a result an HVOF applied coating exhibits considerably less residual tensile stresses than other types of coatings. In most circumstances the residual stresses in the invention coating are compressive rather than tensile. The reduction in residual tensile stresses reduces the cracking tendency of the coating. The reduced tensile stresses and the consequent reduced cracking tendencies allow the deposition of substantially thicker coatings without cracking or spalling. Thus, while the prior art plasma deposit coatings could not be deposited to thicknesses greater than about 6–8 mils without cracking, the present coatings can be applied to thicknesses of more than 40 mils without cracking. This is a substantial improvement which has significant economic implications. The invention coatings are also denser, less porous, have greater bond strength to the substrate and have higher interparticle bond strengths than do the prior art plasma sprayed coatings. These improved properties are all significant for long life brush seal performance.

The present coating also has a different composition from that previously used. Whereas the previously used coating had a composition of 75% weight percent chromium carbide, 25% nickel-chrome, binder or matrix, alloy, the present invention coating composition is centered on a 50% chromium carbide-50% 80 nickel-20 chrome composition (by weight with a broad nickel-chromium range of 15%–30% $Cr_1$ bal Ni). This change in coating composition improves the ductility of the deposited coating and thereby contributes to the reduction in cracking tendency. Whereas the prior art 75-25 chromium carbide-nickel-chrome coating cracks at about 0.4% strain (at room temperature), the invention coating exhibits a room temperature strain to initial cracking of between 0.65% and 0.75%.

We have also identified certain hardness relationships which appear to provide improved brush seal system life. For the superalloy base bristles now used we have found that maximum coating life occurs in a coating hardness range from about 450–650 and preferably about 500–600 VHN. We have also identified a desired relationship between the hardness of the superalloy bristles and the hardness of the coating and we prefer that the hardnesses of the coating and bristles be within 150 VHN of each other. Most preferably the bristles are softer than the coating.

The powder size used to spray the hard base coatings of the invention is finer than that used with the prior art plasma spray process. This is typical in HVOF processes which generally uses a finer size powder than plasma spray processes. The finer powders result in a finer distribution of the chromium carbide phase in the coatings and a more homogeneous microstructure which probably has a positive effect on bristle life.

We have used powder of a size −325 mesh U.S. standard sieve +15 micron. (From about 44 to about 15 microns) the powder used was a mixture of 80 nickel-20 chrome powder and powder of the 75% chromium carbide-25% nichrome composition. The ratio of the powders was adjusted to produce the overall desired weight ratio of 50% chromium carbide-50% nichrome. We believe however that other powder combinations would equally satisfactory, for example a mixture of 50% by weight of nichrome powder, 50% chromium carbide in the desired particle ranges size ranges would be entirely satisfactory.

We apply this coating using standard HVOF processing parameters with a combustion coating systems apparatus with centerline powder feed. In general, coatings are applied to a thickness of in excess of 10 mils, for original part application, and then the coating is ground to a smooth surface with a surface roughness of less than 16 micro inches AA for standard production coatings. We have applied coatings as thick as 40–50 mils without cracking or spalling for repair applications. The coatings of the invention will preferably contain less than 3% by volume of porosity, although amounts of up to 5% or even up to 10% may be useful for certain applications.

The invention coating displays the best life in a brush seal application of any coating which we have investigated to date.

DESCRIPTION OF THE PREFERRED EMBODIMENTS

Coatings having compositions of 75% chromium carbide 20% nickel-chrome; 60% chrome carbide, 40% nickel-chrome; 50% chrome carbide, 50% nichrome; and 40% chrome carbide, 60% nichrome were investigated. We have found that the 50% chrome carbide, 50% nichrome composition produces the best results but the results over the composition range from 40% chrome carbide-60% nichrome to 60% chrome carbide-40% nichrome are satisfactory. We prefer however to use a composition of 45%–55% chrome carbide balance 80% nickel-20% chrome.

We prefer to use chromium carbide as the active hard phase in the coating but we are confident that other carbides including titanium carbide, tungsten carbide, vanadium carbide, and mixtures of these could be substituted in whole or in part for the chromium carbide provided that the hardness relationships to be described below are adhered to. We prefer to use at least 50% by wt. of chromium carbide in the abrasive (carbide) mixture component. Similarly, while we have worked with an 80 nickel-20 chrome binder material there are a variety of alloying elements which could be added to the nickel-chrome composition without adversely affecting its performance as a coating binder. For example, iron and cobalt can be substituted for up to about 10% of the nickel without adverse affects and the minor amounts (up to 5% each, up to 10% total by weight of binder) of solid solution hardening elements such as tungsten, tantalum, niobium and molybdenum could be added to the nichrome under certain conditions where increased coating thickness was required.

We desire that the coating as applied have a hardness between 450–650 VHN and preferably from 500–600 VHN. This range of coatings hardnesses is optimized for use with current bristle materials whose hardness is about 450 VHN (Haynes 25 alloy, nominal composition 20% Cr, 15% W, 10% Ni, 1.5% Mn, 0.1% C, bal Co.). We believe the practical brush seal applications will require that the coating composition will be within 100 VHN of the bristle material, especially for metallic bristles and that the hardness of the bristles should be less than the coating hardness.

In addition to the hardness requirements set forth above we require that the coating have a room temperature strain to crack initiation in excess of about 0.5% and preferably in excess of about 0.6%.

We also require that the coatings be capable of crack free application at thicknesses of greater than 20 mils and preferably greater than 40 mils.

We prefer that the coating have compressive residual stresses.

We accomplish these results through the use of an HVOF deposition process and we prefer to use powder particles whose size is finer than about 325 mesh. We prefer that the finished coating be ground smooth to a surface finish than less than about 25 micro inches AA and preferably less than about 16 micro inches AA.

EXAMPLE

One of ordinary skill in the art will appreciate that the parameters will vary with the use of a different spray gun/system. Accordingly, the parameters set forth herein may be used as a guide for selecting other suitable parameters for different operating conditions.

A brush seal coating was applied by high velocity oxyfuel (HVOF) process. In this process, a spray torch in which gaseous or liquid fuel is combusted with oxygen to produce a high velocity gas stream into which powdered material is injected, heated and propelled onto the part to form the coating.

The processing parameters of the present invention are controlled to produce a chrome carbide 80% nickel-20% chrome coating with properties already described. The parameters described herein were specifically developed for use with a Sulzer Metco Diamond Jet Hybrid HVOF spray system using hydrogen as a fuel gas. (Note: although, the particular HVOF process used to apply this coating utilizes hydrogen as the fuel; we believe other HVOF systems and techniques using other fuels can apply this coating with moderate parameter development). The following description will be understood to refer to the coating of the outside diameter of a shaft.

Following suitable cleaning of the part, masking to protect adjacent surfaces, where coating is not desired, and grit blasting of the area to be coated to provide a roughened surface for coating adhesion; the coating is applied to the part.

During the spray deposition of the coating, the part is rotated to produce surface speeds between about 400 and 600 sfpm (130 smpm–195 smpm). The spray gun is typically located on the outer diameter of the part and traverses in a vertical plane across the area to be coated at a speed of 8–50 inches per minute and at an angle of 45 to 90 degrees (preferably 90 degrees or normal) to the surfaces being coated depending on part configuration. The part surface speed, gun traverse rate and part size affect the part temperature during spraying. External gas cooling may be employed to prevent excess part temperatures. The gun to part distance can vary from 7 to about 11 inches. The powder feed rate is between 75 grams/min. and about 100 grams/min. The nitrogen carrier gas flow is between 25 and 35 scfh, to provide adequate particle injection of the powder into the plume centerline. Standard conditions are herein defined as about room temperature (25 degrees C.) and about one atmosphere of pressure (101 kPa).

The oxygen gas flow to the gun is between 275 and 450 scfh, and the hydrogen gas range flow is between 1450 and 1650 scfh. Nitrogen is used as the cooling gas in the spray gun and its flow range is between 900 and 1000 scfh. We have found the above parameters to be optimum for the deposition process using the Sulzer Metco Diamond Jet water cooled hybrid spray gun (with the standard nozzle designed for hydrogen-oxygen combustion), but one skilled in the art will appreciate that these parameters are dependent on variables, including but not limited to powder type, powder size, fuel gas type, gun type, and part configuration.

Coating hardness can be increased by increasing the vol fraction of the carbide phase, by adding hardeners (Ta, Nb, W, Mo) to the nickel chrome matrix, by decreasing the powder flow rate, by decreasing the distance from the gun to the surface being coated, and/or by increasing the oxygen flow rate. Coating hardness can be decreased by the inverse of the above factors.

With this combination of gun and operating parameter which produces a spray spot size of about 0.5–0.75 inches (12.7–19 mm). To apply a 40 mil thick coating on an 18 in diameter part requires between 30 and 40 minutes using the previously described parameters.

Although this invention has been shown and described with respect to detailed embodiments thereof it will be understood by those skilled in the art that various changes, omissions and additions in form and detail thereof may be made without departing from the spirit and scope of the claimed invention.

We claim:

1. A brush seal system which includes a plurality of stationary bristles which interact with a moving surface, which comprises:

superalloy bristles whose hardness is within 150 VHN of the hardness or moving surface wherein said moving surface has a surface which comprises 40–60 wt. % chrome carbide whose average particle size is less than about 44–15 microns in a nickel-chrome matrix, wherein said surface is essentially crack free.

2. A brush seal system as in claim 1 wherein the coating surface has a room temperature strain to fracture in excess of about 0.5%.

3. A brush seal system as in claim 1 wherein the hardness of the moving surface is from about 450–650 VHN.

4. A brush seal system as in claim 1 wherein the hardness of the bristles is less than the hardness of the moving surface.

* * * * *